United States Patent [19]

Her

[11] Patent Number: 5,499,858

[45] Date of Patent: Mar. 19, 1996

[54] PUMP HIDDEN IN A SEAT TUBE OF A BICYCLE

[75] Inventor: Jern-Shong Her, Changhua, Taiwan

[73] Assignee: Yu Chou Enterprise Corporation, Changhua, Taiwan

[21] Appl. No.: 266,300

[22] Filed: Jun. 27, 1994

[51] Int. Cl.[6] ........................................................ B62J 1/00
[52] U.S. Cl. ..................................... 297/195.1; 297/217.1; 280/201
[58] Field of Search ............................ 297/195.1, 188.09, 297/217.1, 463.2; 280/201; 152/416; 417/569, 313

[56] References Cited

U.S. PATENT DOCUMENTS

| 702,743 | 6/1902 | Pratt | 280/201 |
|---|---|---|---|
| 799,786 | 9/1905 | Freel | 280/201 X |
| 4,121,619 | 10/1978 | Pauliukonis | 137/469 |
| 4,665,943 | 5/1987 | Medvick | 137/543.17 |
| 4,712,592 | 12/1987 | Brown | 280/201 X |
| 4,919,600 | 4/1990 | Yang | 417/313 X |
| 5,016,894 | 5/1991 | Alioto | 280/201 |
| 5,127,804 | 7/1992 | Chappell | 417/231 |
| 5,324,174 | 1/1994 | Diotte | 280/201 X |

FOREIGN PATENT DOCUMENTS

| 450628 | 3/1913 | France | 280/201 |
|---|---|---|---|
| 97859 | 7/1897 | Germany | 280/201 |
| 152037 | 8/1937 | Germany | 280/201 |
| 12390 | of 1908 | United Kingdom | 417/313 |

*Primary Examiner*—Peter M. Cuomo
*Assistant Examiner*—David E. Allred
*Attorney, Agent, or Firm*—Browdy and Neimark

[57] ABSTRACT

A hidden pump removably housed in a seat tube and engaged with the saddle of a bicycle has a cylinder tube and a hollow pumping rod which is movably received in the cylinder tube. Inside the pumping rod which is provided with a piston block at one end and a handle at the other is received a flexible air duct. The air duct having coupling heads is removably engaged with an air outlet nozzle of the pump and an air inlet nozzle of a tire respectively at each end thereof. To pump air into a tire, the saddle is put upside down and abuts against ground, retained in place by feet, and the pump rod is pulled up and pushed down repeatedly with the handle thereof held by hand.

1 Claim, 5 Drawing Sheets

PUMP HIDDEN IN A SEAT TUBE OF A BICYCLE

BACKGROUND OF THE INVENTION

The present invention relates to a hidden pump housed in a seat tube of a bicycle and taken out with ease and speed. The pump is integrally assembled with a bicycle saddle. A coupling tube is downwardly extended from a saddle mount of a saddle with a cylinder tube removably connected to the coupling tube. In the cylinder tube is slidably housed a pumping rod and a flexible air duct used to connect the pump to a tire is received in the hollow pumping rod. The pumping rod can be slidably operated in the pump tube to compress air into a tire. The pump assembly can be quickly housed in a seat tube of a bicycle and be locked in place by a quick locking means.

When a tire of a bicycle becomes flat in the middle of riding, it is rather difficult for a person to locate a pump for inflation. In general, a bicycle itself is not equipped with a pump and a person must secure an extra bulky pump to somewhere on the bicycle when riding a long distance. Otherwise, a person must bring a bicycle with a flat tire to a bicycle shop for repair and inflation. Fixing such a bulky pump to a bicycle may cause inconvenience to the operation of the same in one aspect and the exposure of such a pump spoils the outer look of a bicycle in another aspect.

SUMMARY OF THE INVENTION

Therefore, the primary object of the present invention is to provide a hidden pump housed in a seat tube of a bicycle so as to permit a pump to be produced in a compact size and be carried around without occupying any additional space and increasing any load.

DETAILED DESCRIPTION OF THE PREFERRED EMBODIMENT

Figure 1:
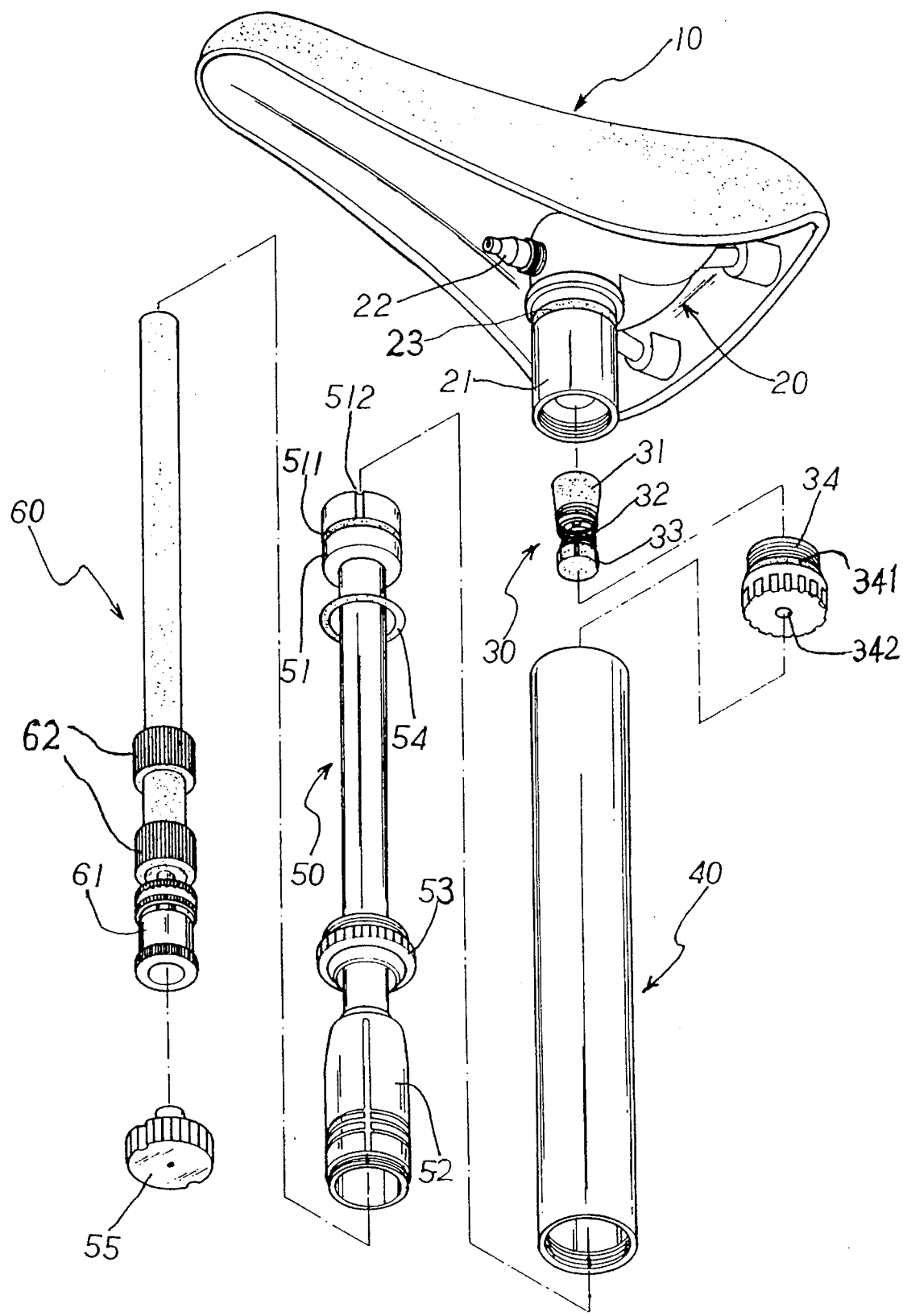
FIG. 1 is a perspective diagram showing the exploded components of the present invention.

Referring to FIG. 1, a perspective diagram showing exploded components of the present invention is given. A saddle 10 of a bicycle has an integrally formed saddle mount 20 which is provided with an extended hollow coupling tube 21. The tube 21 has an inner air passage 35 terminating in an outlet nozzle 22 at the upper end thereof and engaged at the lower end with a check valve assembly 30 including a cushion 31, a spring 32 and a sealing cork 33.

A check lid 34 having an air hole 342 and a sealing ring 341 is provided with outer threads at one end thereof so as to permit the check lid 34 to be removably secured to the lower end of the extended tube 21 having inner threads disposed thereon. The check valve assembly 30 is disposed near the bottom end of the extended coupling tube 21.

A sealing ring 23 is mounted to the outer periphery of the coupling tube 21 so as to permit an elongated cylinder tube 40 to be sealedly engaged with the coupling tube 21. Into the cylinder tube 40 is located an elongated hollow pumping rod 50; and a cylindrical piston block 51 is secured to the front end of the pumping rod 50.

To the middle periphery of the piston block 51 is mounted a sealing ring 511. A pair of vertical air passage grooves 512 are symmetrically disposed at the end of the piston block 51. A handle 52 is disposed at the other end of the pumping rod 50, and a removable lid 53 having outer threads at one end thereof is disposed next to the handle 52. A washer 54 is disposed in association with the removable lid 53. The removable lid 53 is screwed to the bottom end of the cylinder tube 40 in assembly.

Figure 2:
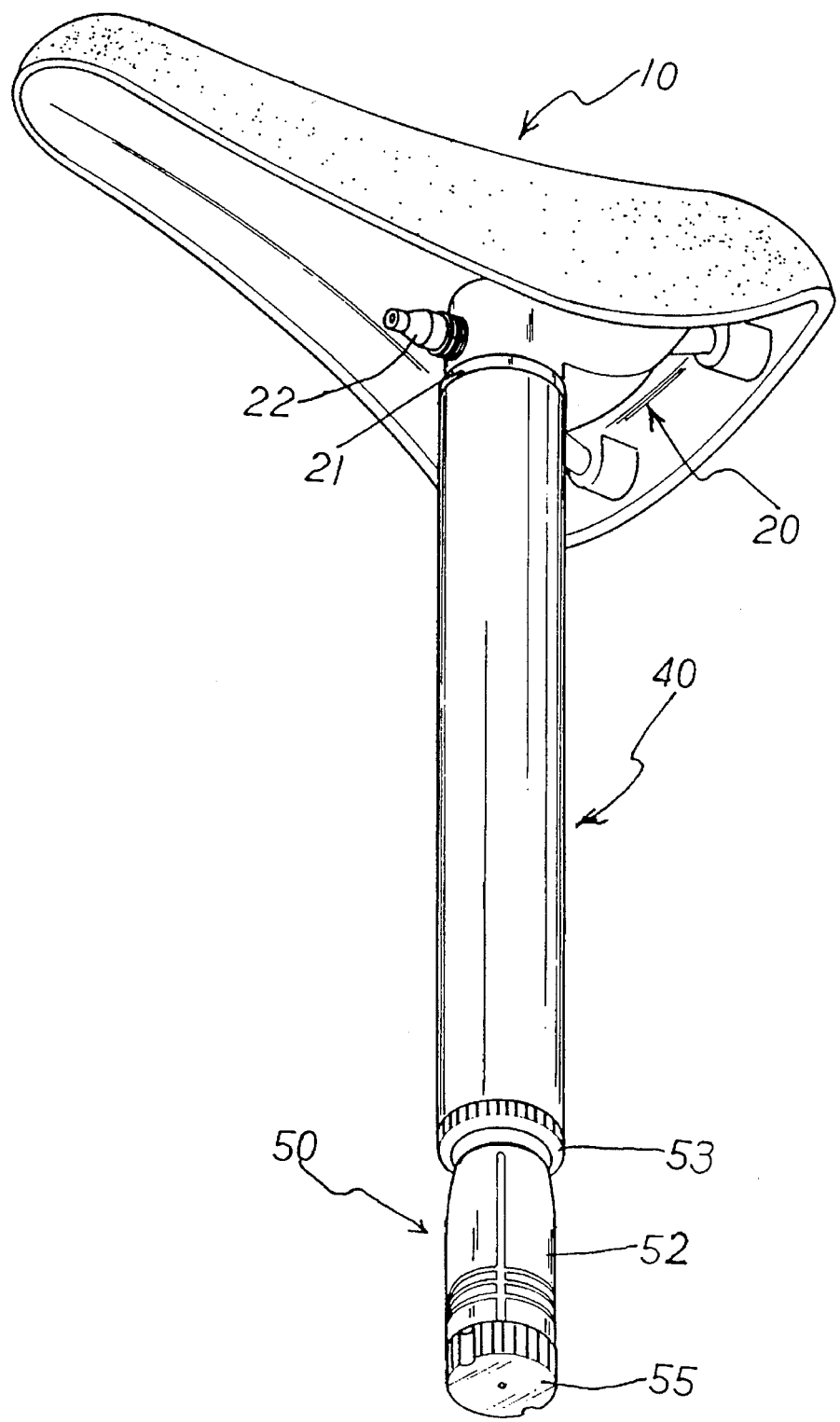
FIG. 2 is a perspective diagram showing the assembly of the present invention.
Figure 3:
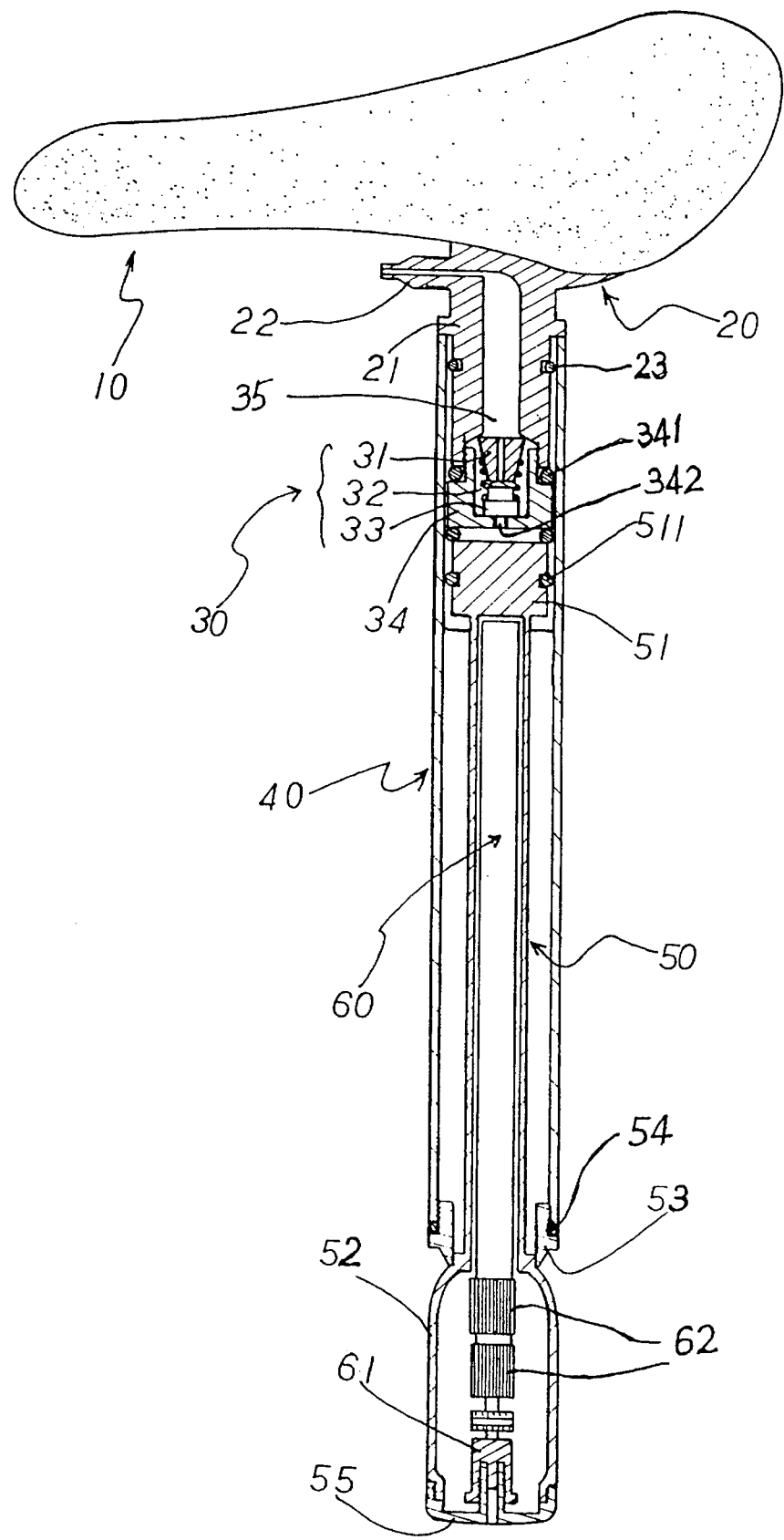
FIG. 3 is a sectional diagram thereof.

A flexible air duct 60 having a first coupling head 61 and a pair of second coupling heads 62 is received in the hollow pumping rod 50. After the air duct 60 is located inside the pumping rod 50, a cover 55 is screwed to the end of the handle 52. Thus, the assembly of a hidden pump of the present invention is completed, as shown in FIG. 2, 3.

Figure 4:
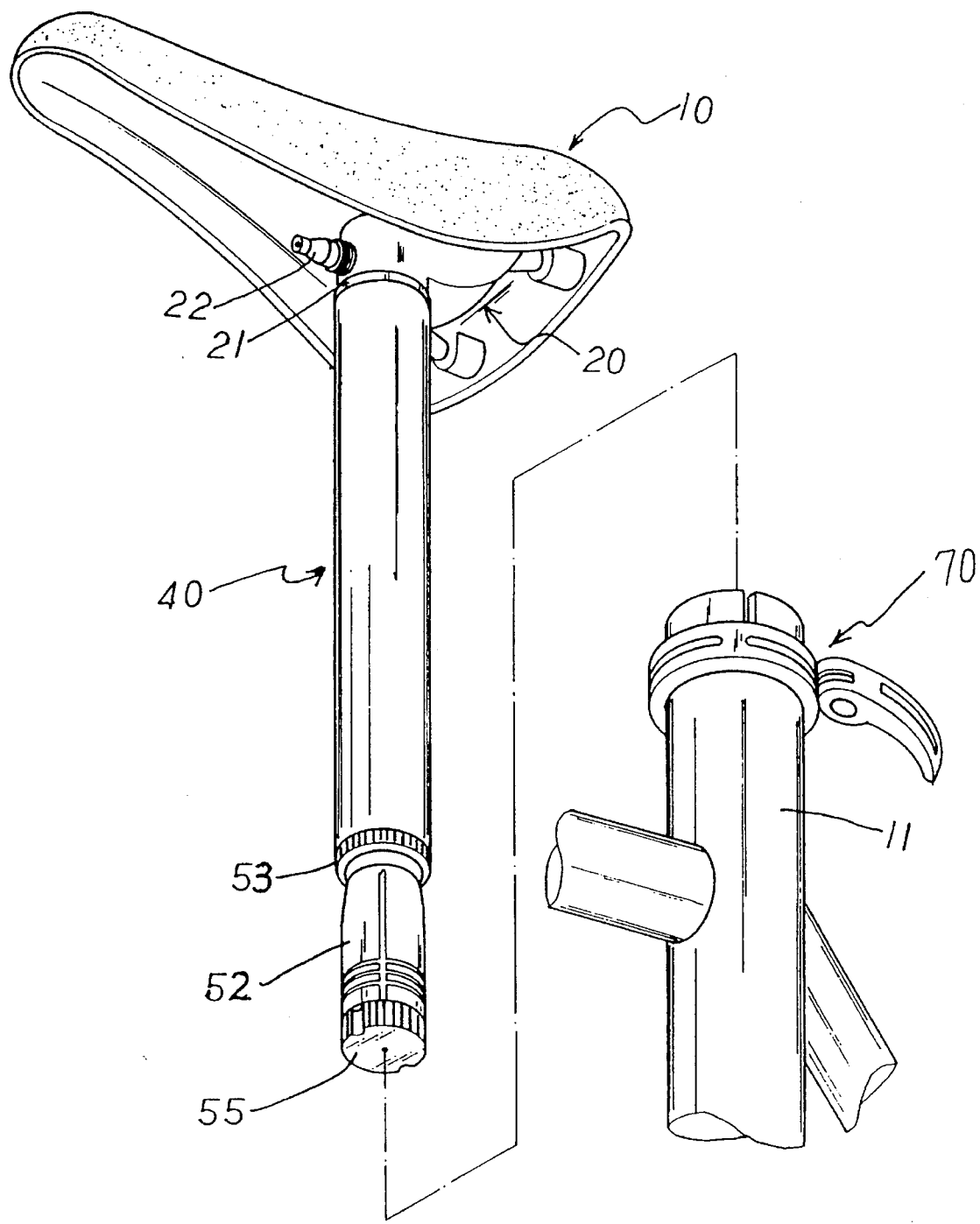
FIG. 4 is a diagram showing the present invention and a seat tube in which the pump is housed.

Referring to FIG. 4, the pump assembly of the present invention including a saddle 10 of a bicycle and the cylinder tube 40 and the handle 52 can be received in a hollow seat tube 11 and retained in place with speed and ease by a quick locking means 70. To take out the pump assembly, the quick locking means 70 is pivoted opened first, and then the saddle 10 is pulled upwardly to disengage the same from the seat tube 11.

Figure 5:
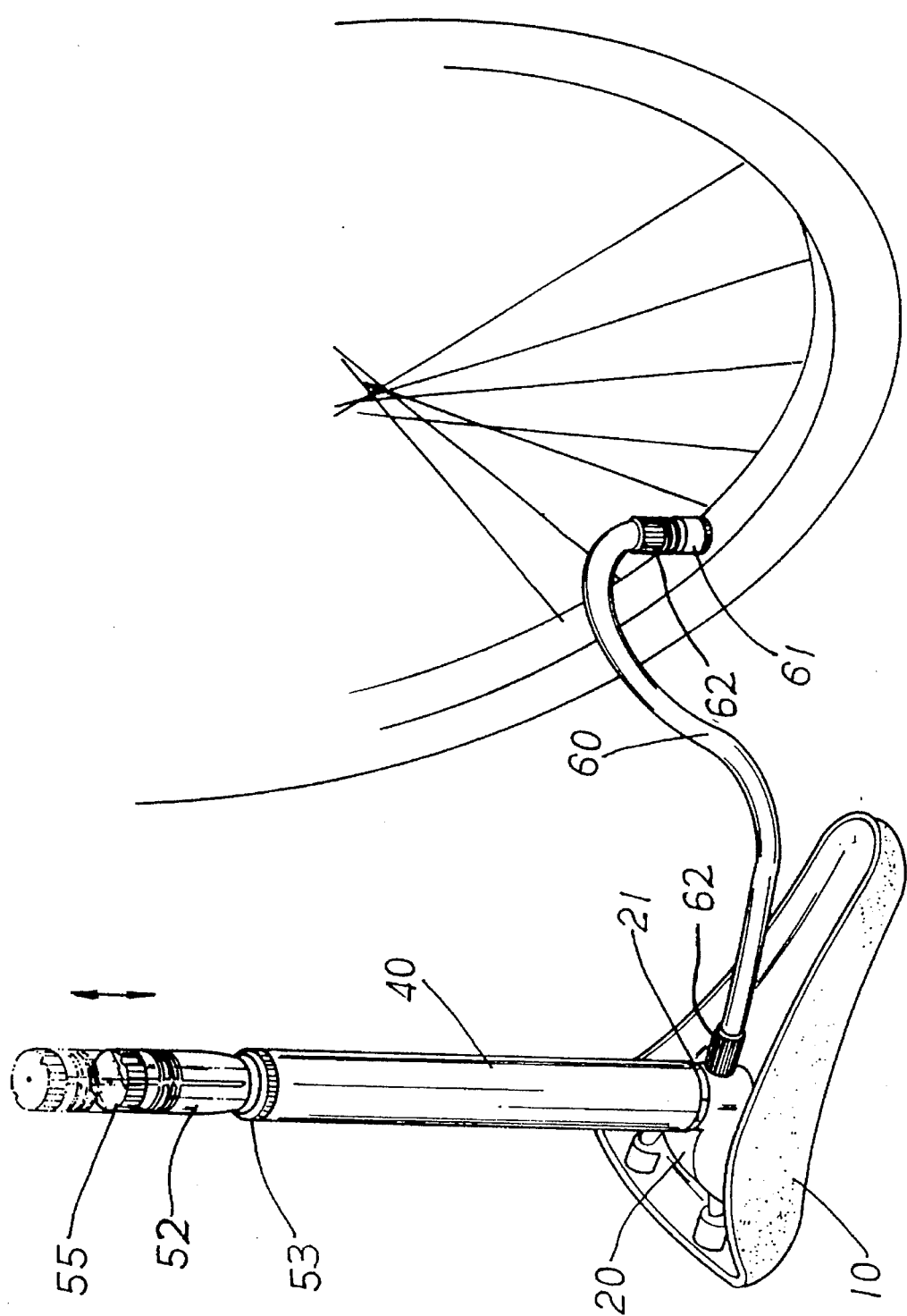
FIG. 5 is a diagram showing the practical operation of the present invention.

As further shown in FIG. 5, the removed saddle 10 is put upside down and abuts against a floor, and the cover 55 is removed so as to take the rubber air duct 60 out. One end of the air duct 60 is connected to the outlet nozzle 22 of the pump assembly which is integrally disposed on the saddle mount 20, and the other end of the air duct 60 is coupled to a inlet nozzle of a tire of a bicycle by way of a first coupling head 61. The saddle 10 can be retained in place by feet with the pumping rod 50 then pulled up and pushed down repeatedly with force so as to pump the air inside the cylinder tube 40 to flow via the check valve assembly 30, the air passage 21 and the outlet nozzle 22 to inflate a tire.

In case the inlet nozzle of a tire does not conform to the first coupling head 61 of the air duct 60, the coupling head 61 can be removed and the end of the air duct 60 can be engaged directly with the inlet nozzle and further retained in place by a second coupling head 62.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A hidden pump able to be housed in a seat tube of a bicycle having a tire and quick fixing means, comprising:

a saddle having an integrally formed seat mount provided with an extended coupling tube fixed thereon;

said seat mount having an air passage disposed internally therein between an end of said coupling tube and an air outlet nozzle extended therefrom;

a check valve disposed in said coupling tube and held therein by a check lid having a through hole, said check lid engaged with the end of said coupling tube so as to confine said check valve in said coupling tube; said check valve having a cushion which is provided with an air passage, a spring, and a cork;

a cylinder tube engaged with said coupling tube;

said coupling tube having a first sealing ring disposed on an end periphery thereof for engaging said cylinder tube;

said coupling tube and said check valve being fixed relative to said cylinder tube during pump use and storage;

a hollow pumping rod having a piston block at a first end and a handle at a second end;

a removable lid slidably disposed in between said piston block and said handle and being secured to a cylinder tube end after said hollow pumping rod is housed in said cylinder tube so as to permit said pumping rod to be repeatedly pulled and pushed inside said cylinder tube;

a flexible air duct having coupling means disposed thereon for securing air duct ends thereof to said air outlet nozzle and to an air inlet of the tire, said flexible air duct being housed inside said hollow pumping rod;

said air duct being removably received inside said hollow pumping rod;

a cover being engaged with a handle end of said pumping rod after said air duct has been housed inside said pumping rod;

said piston block having vertical air passage grooves disposed on a cylindrical periphery thereof and having a second sealing ring disposed next to said passage grooves;

a washer being associated with said removable lid of said pumping rod;

said cylinder tube, with said pumping rod received therein and said flexible air duct received in said pumping rod, being connected with said saddle and capable of being housed in the seat tube of the bicycle;

said pump assembly capable of being secured in place to said seat tube of the bicycle by way of the quick fixing means, permitting said pump assembly to be readily removed with speed.

* * * * *